United States Patent
Kong et al.

(10) Patent No.: US 11,474,594 B2
(45) Date of Patent: Oct. 18, 2022

(54) VIRTUAL REALITY DISPLAY METHOD, DEVICE AND APPARATUS, AND COMPUTER STORAGE MEDIUM

(71) Applicant: ZTE CORPORATION, Guangdong (CN)

(72) Inventors: Dehui Kong, Guangdong (CN); Ke Xu, Guangdong (CN); Xiao Zhang, Guangdong (CN); Bin Han, Guangdong (CN); Chong Xiang, Guangdong (CN); Shuai Jiao, Guangdong (CN); Hong Wang, Guangdong (CN); Guoning Lu, Guangdong (CN); Degen Zhen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/311,393

(22) PCT Filed: Dec. 16, 2019

(86) PCT No.: PCT/CN2019/125638
§ 371 (c)(1),
(2) Date: Jun. 7, 2021

(87) PCT Pub. No.: WO2020/199822
PCT Pub. Date: Jun. 18, 2020

(65) Prior Publication Data
US 2022/0026982 A1    Jan. 27, 2022

(30) Foreign Application Priority Data
Dec. 14, 2018 (CN) .......................... 201811534066.3

(51) Int. Cl.
G06F 3/01 (2006.01)
G09G 3/00 (2006.01)
G06T 3/00 (2006.01)
(52) U.S. Cl.
CPC .............. *G06F 3/011* (2013.01); *G06T 3/005* (2013.01); *G09G 3/03* (2020.08); *G09G 2340/0464* (2013.01); *G09G 2354/00* (2013.01)

(58) Field of Classification Search
CPC .. G06F 3/011; G09G 3/03; G09G 2340/0464; G09G 2354/00; G06T 3/005
See application file for complete search history.

(56) References Cited

U.S. PATENT DOCUMENTS

| 11,297,686 B2 * | 4/2022 | Liu ..................... H04W 74/002 |
| 2012/0123742 A1 | 5/2012 | Harrison et al. |

(Continued)

FOREIGN PATENT DOCUMENTS

| CN | 106648067 A | 5/2017 |
| CN | 106792180 A | 5/2017 |

(Continued)

OTHER PUBLICATIONS

WIPO, International Search Report dated Feb. 24, 2020.
China Patent Office, First Office Action dated Apr. 2, 2022, for corresponding Chinese application No. 201811534066.3.

*Primary Examiner* — Yu Chen
(74) *Attorney, Agent, or Firm* — Li & Cai Intellectual Property (USA) Office

(57) ABSTRACT

A virtual reality display method, device, apparatus and storage medium are provided. The method includes: acquiring multimedia data to be displayed and a visible region of a viewer on a curved display surface, wherein the visible region is obtained by projecting a visible range of the viewer to the curved display surface, and is not larger than a display area of the curved display surface; determining target curvatures of at least two positions in the visible region of the viewer, wherein in the target curvatures, target curvatures of different positions are related to a distance to a center of the visible region of the viewer; adjusting, based on the target curvatures of the at least two positions in the visible region, a curvature of a corresponding position on the curved display surface; and mapping the multimedia data to be displayed to the curved display surface having the adjusted curvature.

10 Claims, 8 Drawing Sheets

(56) References Cited

U.S. PATENT DOCUMENTS

| | | | |
|---|---|---|---|
| 2015/0317949 A1* | 11/2015 | Cho | G09G 5/14 345/31 |
| 2016/0133169 A1* | 5/2016 | Park | G09G 3/20 345/6 |
| 2016/0165218 A1 | 6/2016 | Seo et al. | |
| 2017/0300121 A1* | 10/2017 | Lundberg | G06F 3/013 |
| 2018/0374398 A1* | 12/2018 | Lee | G02F 1/133305 |
| 2019/0011776 A1* | 1/2019 | Shao | G02B 27/0944 |
| 2019/0349627 A1* | 11/2019 | Di | H04N 21/25833 |
| 2019/0361230 A1 | 11/2019 | Chung et al. | |
| 2020/0036935 A1 | 1/2020 | Lee et al. | |
| 2020/0400956 A1* | 12/2020 | Xu | G02B 27/0176 |

FOREIGN PATENT DOCUMENTS

| | | |
|---|---|---|
| CN | 106851356 A | 6/2017 |
| CN | 108282449 A | 7/2018 |
| KR | 20180029772 A | 3/2018 |
| WO | WO 2017076232 A | 5/2017 |

\* cited by examiner

VIRTUAL REALITY DISPLAY METHOD, DEVICE AND APPARATUS, AND COMPUTER STORAGE MEDIUM

CROSS-REFERENCE TO RELATED APPLICATION

The present application claims priority to the Chinese patent application No. 201811534066.3 filed with the China Patent Office on Dec. 14, 2018, the entire contents of which are incorporated herein by reference.

TECHNICAL FIELD

Embodiments of the present disclosure relate to the field of virtual reality technology, and for example, relates to a virtual reality display method, device and apparatus, and a computer storage medium.

BACKGROUND

Virtual Reality (VR) technology can create a virtual information scenario in a multidimensional information space, thereby enabling a user to have deep immersion. With the help of a Head Mounted Device (HMD), a user can view an image close to a reality scenario, and the limitations of time and space on human experience can be effectively released.

However, an obvious bottleneck of VR display technology is that the display content is not comparable with the reality scenario; because the horizontal Field of View (FOV) of human eyes when viewing objects is in the range of 120° to 180°, whereas the horizontal FOV of VR apparatuses can only reach the range of 60° to 120°. Due to the above limitation of the horizontal FOV, when using a VR apparatus, a user may inevitably observe a black border around the display interface, and thus is likely to have a bad feeling of "sitting in the well looking at the sky".

However, significant distortion will be introduced if the display data of a panoramic image or video is directly enlarged to large wide-angle flat display. Taking the panoramic image as an example, the VR apparatus displays a two-dimensional planar panoramic image by simulating it into a real three-dimensional graph, but the single point-to-point mapping from two-dimensional data to three-dimensional data has a defect that distortion become more obvious as the distance to the center of the field of view gets farther, and the central region of the field of view is compressed with expansion of the FOV, resulting in interference to the information acquired by the user. Therefore, a virtual reality display method is urgently needed to solve the above problems.

SUMMARY

The embodiments of the present disclosure provide a virtual reality display method, device and apparatus, and a computer storage medium.

In an embodiment of the present disclosure, there is provided a virtual reality display method, including: acquiring multimedia data to be displayed and a visible region of a viewer on a curved display surface, wherein the visible region is obtained by projecting a visible range of the viewer to the curved display surface, and the visible region is not larger than a display area of the curved display surface; determining target curvatures of at least two positions in the visible region of the viewer, wherein in the target curvatures of the at least two positions, target curvatures of different positions are related to a distance to a center of the visible region of the viewer; adjusting, based on the target curvatures of the at least two positions in the visible region, a curvature of a corresponding position on the curved display surface; and mapping the multimedia data to be displayed to the curved display surface having the adjusted curvature.

In an embodiment of the present disclosure, there is provided a virtual reality display device, including at least: an acquisition unit configured to acquire multimedia data to be displayed and a visible region of a viewer on a curved display surface, wherein the visible region is obtained by projecting a visible range of the viewer to the curved display surface, and the visible region is not larger than a display area of the curved display surface; a calculation unit configured to determine target curvatures of at least two positions in the visible region of the viewer, wherein in the target curvatures of the at least two positions, target curvatures of different positions are related to a distance to a center of the visible region of the viewer; an adjustment unit configured to adjust, based on the target curvatures of the at least two positions in the visible region, a curvature of a corresponding position on the curved display surface; and a processing unit configured to map the multimedia data to be displayed to the curved display surface having the adjusted curvature.

In an embodiment of the present disclosure, there is provided a virtual reality display apparatus, including: a processor, and a memory configured to store a computer program operable on the processor, wherein the processor is configured to, when executing the computer program, perform the above method.

In an embodiment of the present disclosure, there is provided a computer-readable storage medium storing computer executable instructions thereon, wherein the computer executable instructions are configured to cause the above method to be implemented.

DETAILED DESCRIPTION

The specific embodiments described herein are merely for illustration of the present disclosure and are not intended to limit the present disclosure.

In the description below, suffixes representing elements, such as "module", "component" or "unit", are used only for the convenience of explanation of the present disclosure, and have no specific meaning by themselves. Thus, "module", "component" or "unit" may be used interchangeably.

Figure 1:
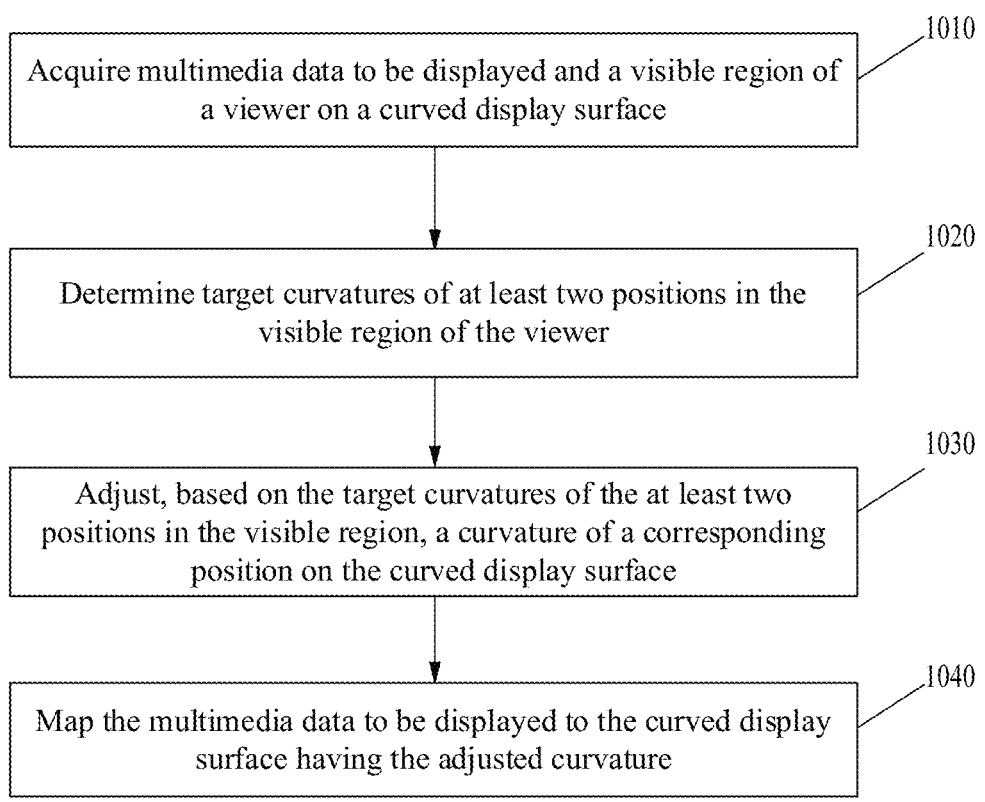
FIG. 1 is a schematic diagram illustrating an implementation flow of a virtual reality display method according to an embodiment of the present disclosure.

In an embodiment of the present disclosure, there is provided a virtual reality display method. The method, as shown in FIG. 1, includes steps 1010 to 1040.

At step 1010, multimedia data to be displayed and a visible region of a viewer on a curved display surface are acquired.

The visible region is obtained by projecting a visible range of the viewer to the curved display surface, and the visible region is not larger than a display area of the curved display surface.

Here, the step 1010 of acquiring multimedia data to be displayed and the visible region of the viewer on the curved display surface, may be implemented by a virtual reality display device. In practical applications, the virtual reality display device may be an HMD with a display screen, a computer, a television, etc.; the display screen is made of a flexible material, and the curvature at each position thereof may be controlled by the virtual reality display device. The display screen may be understood as the curved display surface in step 1010.

Figure 2:
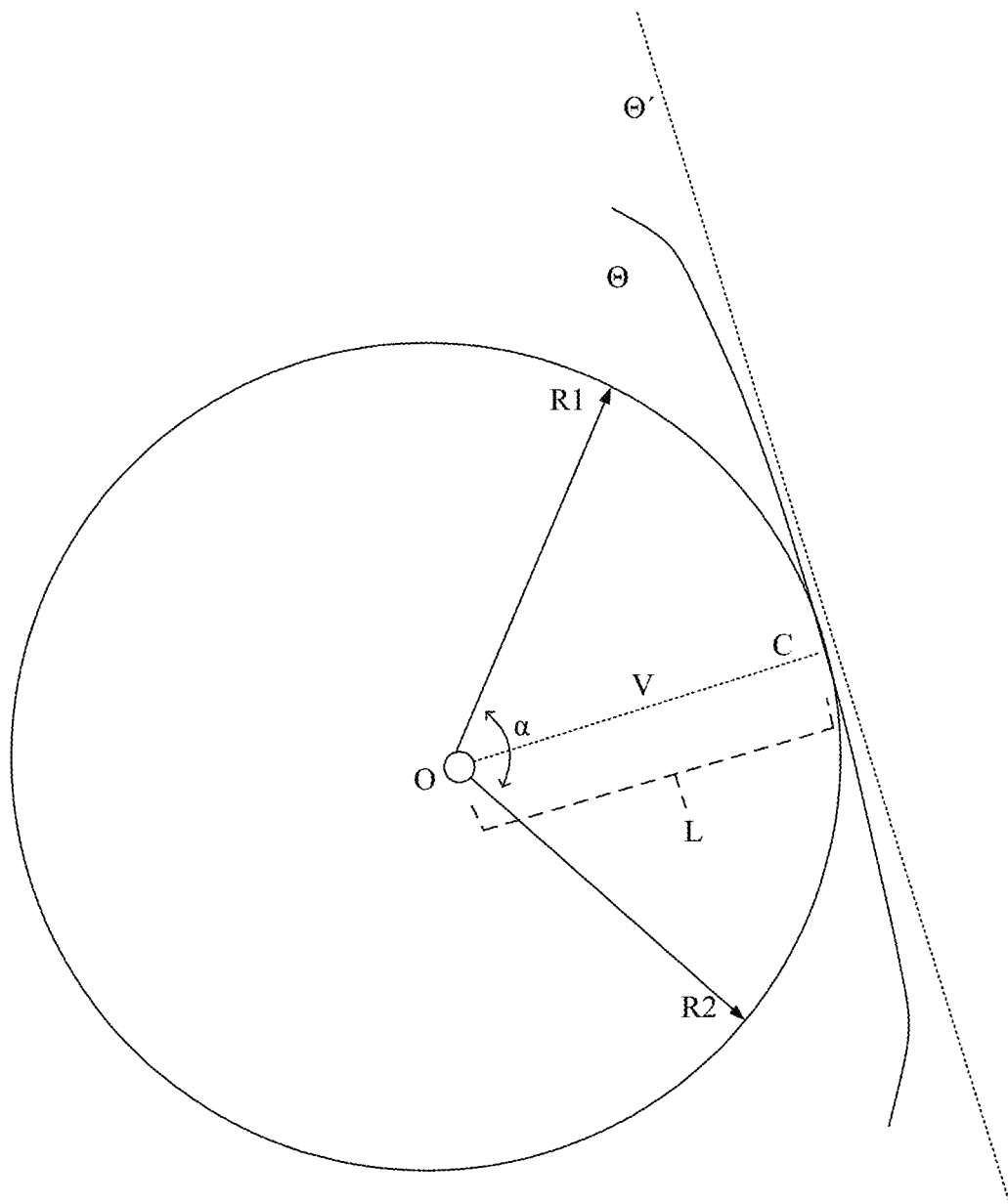
FIG. 2 is a schematic diagram illustrating a positional relation between a viewer and a curved display surface according to an embodiment of the present disclosure.

In other embodiments of the present disclosure, the multimedia data to be displayed may refer to a panoramic image or a panoramic video. The viewer means a user viewing multimedia data such as an image or video through the virtual reality display device. The visible region is obtained by projecting a visible range of the viewer to the curved display surface. Here, the visible range of the viewer is determined by at least FOV information of the viewer, a center of a field of view of the viewer, and a distance from a viewpoint (i.e., an eyeball of the viewer) to the curved display surface. In an embodiment, the FOV information represents a magnitude of a FOV of the viewer. In practical applications, the angle range of one circle horizontally around the human body is defined to be 360° (i.e., −180° to 180°), and the angle range in the vertical direction is defined to be 180° (i.e., −90° to 90°). According to human physiological characteristics, the magnitude of FOV information (horizontal FOV×vertical FOV) of a viewer generally does not exceed 180°×180°. The center of the field of view of the viewer refers to the focal point of the line of sight of the viewer on the curved display surface. As shown in FIG. 2, the circle represents a spherical reference surface, which can be understood as an ideal viewing sphere of a viewer, the center O of the circle represents a viewpoint of the viewer, $\Theta$ represents the curved display surface, $\Theta'$ represents a display plane of a display method in the existing art, the point C represents a center of the field of view of the viewer on the curved display surface $\Theta$, the ray V represents a line of sight from the viewpoint to the center C of the field of view, L represents a distance from the viewpoint to the curved display surface $\Theta$, and the angle α formed by rays R1 and R2 is FOV of the viewer. As can be seen from FIG. 2, the visible region of the viewer can be determined at least by the angle α, the center C of the field of view and the distance L. That is, the visible region may vary in real time according to the viewing information of the user.

In this embodiment, the visible region has an area not larger than a display area of the curved display surface. That is, the curved display surface may include the maximum field of view of the viewer, and thus the problem of black borders caused by insufficient FOV in VR display can be overcome. In an embodiment, the viewer may, according to his/her own viewing preferences, dynamically adjust the distance from the viewpoint to the curved display surface through an external remote sensing button provided by the VR display device.

At step 1020, target curvatures of at least two positions in the visible region of the viewer are determined.

In the target curvatures of the at least two positions, target curvatures of different positions are related to a distance to a center of the visible region of the viewer. The step 1020 of determining target curvatures of at least two positions in the visible region of the viewer, may be implemented by a virtual reality display device.

In an embodiment, the virtual reality display device may acquire target curvatures of at least two positions in the visible region of the viewer based on a quasi-conformal mapping method; and implement curvature control on the curved display surface by selecting a suitable quasi-conformal mapping function Quasi−ConformalMapping(x, y).

In other embodiments of the present disclosure, the curvature may be different at different positions in the visible region. Also, target curvatures of different positions are related to a distance to a center of the visible region. The center of the visible region can be understood as the center of the field of view in step 1010.

The quasi-conformal mapping is described below:

In practical applications, conformal mapping refers to mapping one region to another through an analytic function, by which an irregular problem or a problem with unclear description of mathematical properties can be mapped to a regular or relatively well-studied problem. A complex planar region $C_1$ may be mapped to a region $C_2$ by:

$$\varphi:C_1 \to C_2, w=\varphi(z) \qquad (1);$$

where z represents a complex number, and w represents the mapped result of $\varphi$.

The conformal mapping scheme can map infinite small circles in a curved surface to infinite small circles, while a common diffeomorphism maps infinite small ellipses to infinite small circles; and if the eccentricity of the ellipse (a focal interval of the ellipse divided by a length of the major axis) is bounded, the diffeomorphism is called quasi-conformal mapping. For example, for a set of conformal mappings in the complex domain:

$$f(z)=z^2-2z \qquad (2);$$

the derivative is $|f'(z)|=|2z-2|=2\sqrt{(a-1)^2-b^2}$, where $z=a+bi$, and $|\cdot|$ represents modulo operation. In order to achieve the effect of diffeomorphism, it may be set that $|f'(z)|<1$, where the necessary and sufficient condition for $|f'(z)|<1$ is $2\sqrt{(a-1)^2-b^2}<1$, i.e., within a circle having a center of (1, 0) and a radius of 0.5, the mapping reflects a reduction function, while outside the circle, the mapping reflect an amplification function. The zoom region may be adjusted through reasonable parameter setting. Also, since the mapping is smooth everywhere, there is no apparent "tearing" phenomenon.

In an embodiment of the present disclosure, panoramic video or image frames in the multimedia data to be displayed are mapped onto the curved display surface by means of the quasi-conformal mapping idea. In order to realize the mapping from the spherical reference surface to the curved display surface, an ideal scheme is to find a smooth diffeomorphism to reduce the geometric distortion. However, perfect conformal transformation is usually difficult to find, and thus, in the present disclosure, the conformal mapping is expanded to common diffeomorphisms, i.e., the wide-angle display of VR is realized by the method of quasi-conformal mapping. To implement mapping of the curved display surface to the spherical reference surface shown in FIG. 2 without tearing, two quasi-conformal mapping schemes are provided: one is a curvature varying method based on an exponential function, and the other is a curvature varying method based on a Gaussian function.

At step 1030, based on the target curvatures of the at least two positions in the visible region, a curvature of a corresponding position on the curved display surface is adjusted.

The step 1030 of adjusting, based on the target curvatures of the at least two positions in the visible region, a curvature of a corresponding position on the curved display surface, may be implemented by a virtual reality display device. Here, positions in the visible region are in one-to-one correspondence with positions on the curved display surface; and the virtual reality display device obtains the target curvatures of a plurality of positions in the visible region based on real-time calculation to adjust the curvature of a corresponding position in the curved display surface.

At step 1040, the multimedia data to be displayed is mapped to the curved display surface having the adjusted curvature.

The step 1040 of mapping the multimedia data to be displayed to the curved display surface having the adjusted curvature, may be implemented by a virtual reality display device.

In an embodiment, the virtual reality display device acquires a positional correspondence relation between the multimedia data to be displayed and the curved display surface having the adjusted curvature; and the virtual reality display device generates target display multimedia data based on the positional correspondence relation between the multimedia data to be displayed and the curved display surface having the adjusted curvature, and displays the target display multimedia data in the curved display surface having the adjusted curvature.

In an embodiment, the positional correspondence relation between the multimedia data to be displayed and the curved display surface having the adjusted curvature refers to a position of each pixel point in the multimedia data to be displayed on the curved display surface having the adjusted curvature, and a pixel point in the multimedia data to be displayed corresponding to each position of the curved display surface having the adjusted curvature. In this manner, the virtual reality display device can obtain pixel information, namely a Red-Green-Blue (RGB) value, to be displayed at each position of the curved display surface having the adjusted curvature; and generate the target display multimedia data based on the pixel information to be displayed at each position of the curved display surface having the adjusted curvature.

According to the virtual reality display method provided in the embodiments of the present disclosure, the display region can be determined based on a visible range of a viewer, thereby effectively relieving the problem of black borders caused by insufficient FOV in VR display, as well as the negative effect of dizziness caused by a narrow field of view. Meanwhile, according to the embodiments of the present disclosure, the curvature corresponding to at least one position in the visible region of the viewer can be controlled, and the image to be displayed can be displayed on the curved display surface having the adjusted curvature, thereby reducing the distortion caused by large wide-angle display, and improving the display effect of virtual reality.

Figure 3:
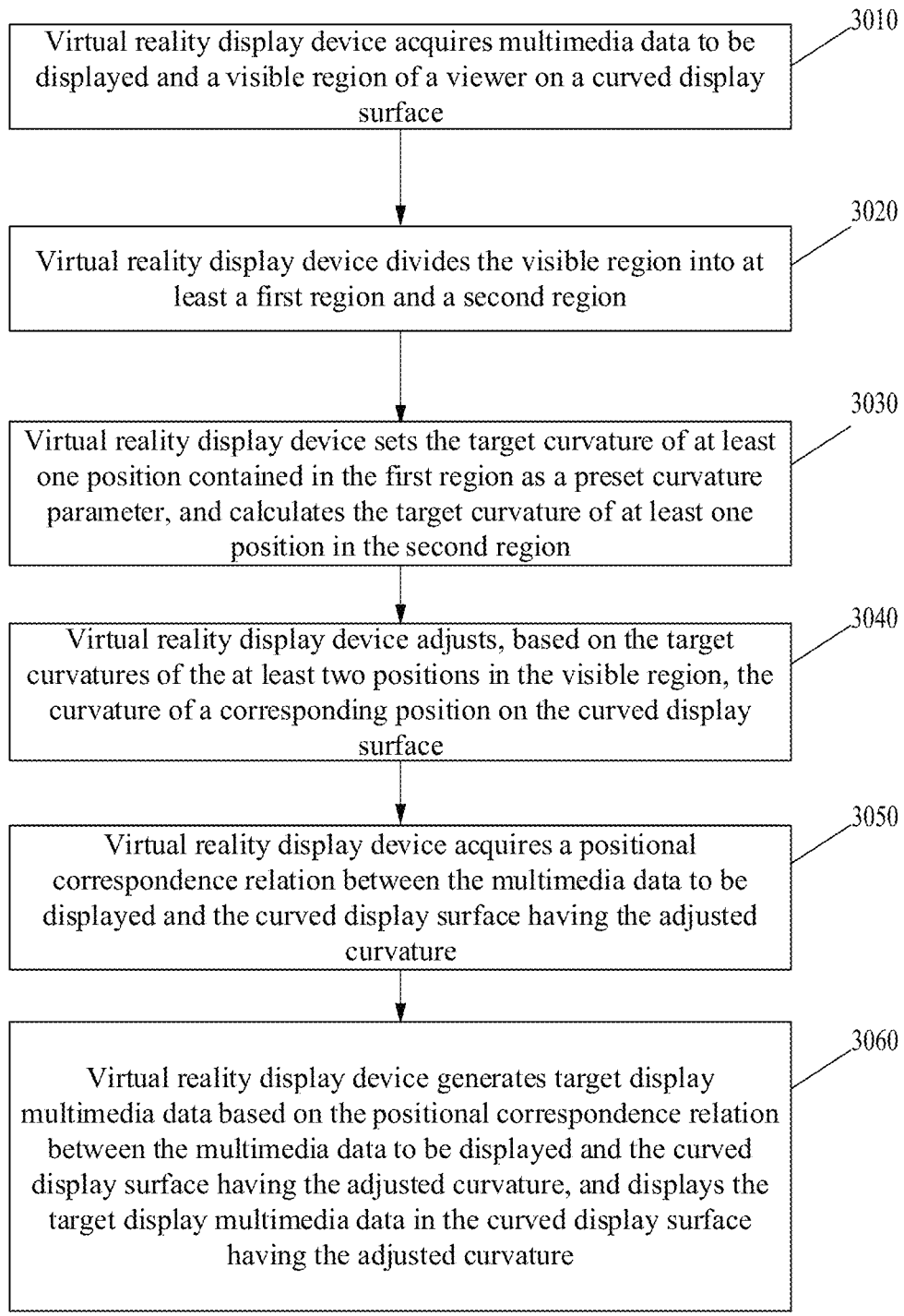
FIG. 3 is a schematic diagram illustrating an implementation flow of another virtual reality display method according to an embodiment of the present disclosure.

Based on the foregoing embodiments, another virtual reality display method is provided in an embodiment of the present disclosure. The method, as shown in FIG. 3, includes steps 3010 to 3060.

At step 3010, the virtual reality display device acquires multimedia data to be displayed and a visible region of a viewer on a curved display surface.

The visible region is obtained by projecting a visible range of the viewer to the curved display surface, and the visible region is not larger than a display area of the curved display surface.

At step 3020, the virtual reality display device divides the visible region into at least a first region and a second region.

In practical applications, the viewer focuses on the center of the visible region, and therefore, the influence of image distortion on the viewer decreases as getting closer to an edge of the visible region. On this basis, the virtual reality display device may divide the visible region, and determine target curvatures of different regions according to the influence of image distortion on the viewer. In this embodiment, the first region may refer to a fine display region in the center of the field of view, and the second region may be a blurred display region in an extension portion of the visible range.

In an embodiment, the virtual reality display device may acquire division information for dividing the visible region, and divide the visible region into a first region and a second region based on the division information. Here, the division information includes a shape and a size of the region to be divided; and the division information may be determined according to preferences of the user.

Figure 4:
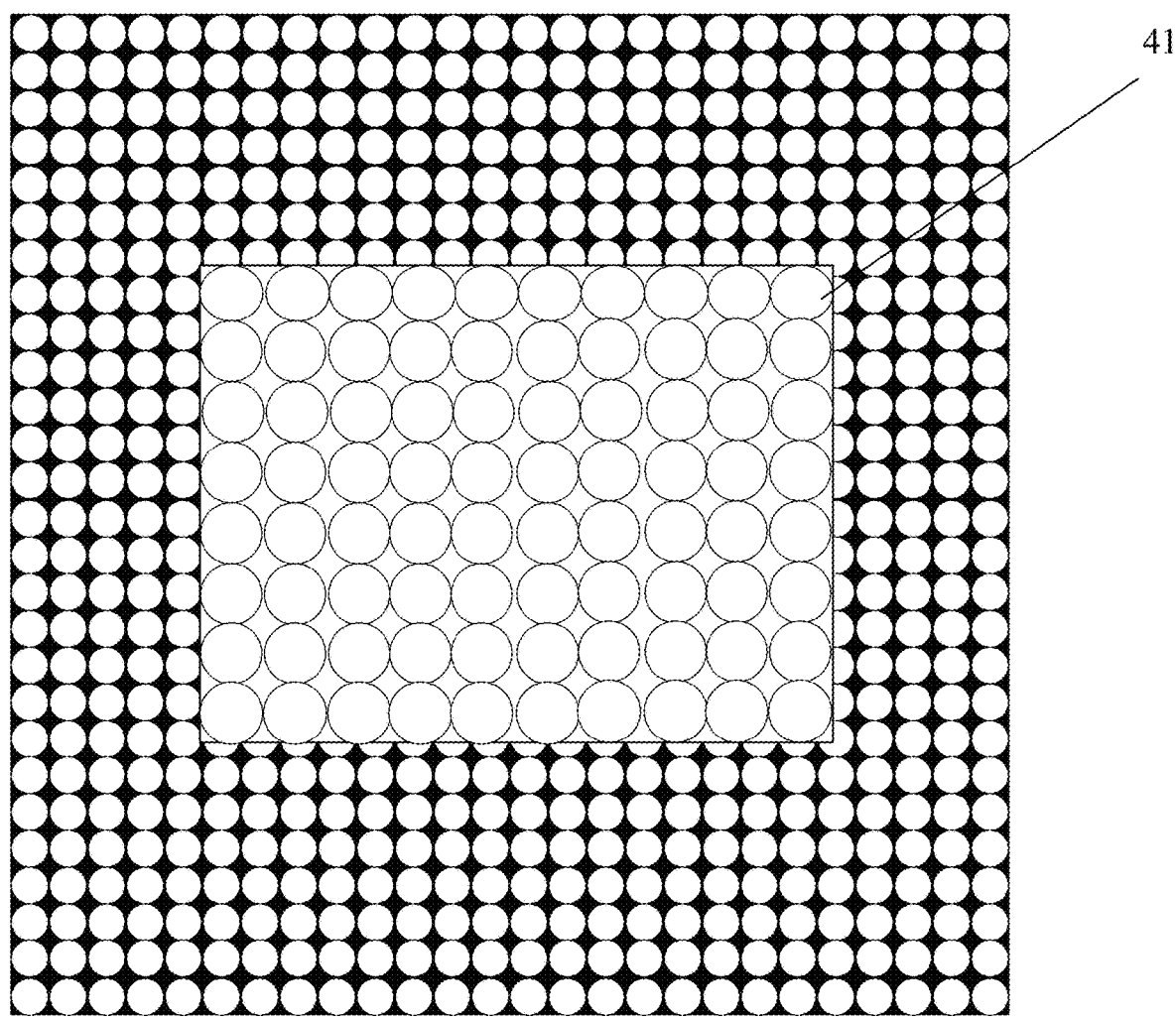
FIG. 4 is a schematic diagram illustrating division of the visible region in a square mode according to an embodiment of the present disclosure.

In an implementation, the visible region may be divided in a square mode. For example, FIG. 4 shows the entire region visible by a single eye, in which the region in the square frame indicated by 41 is a first region, and in the entire region visible by a single eye, the other region excluding the first region is a second region. Each circle in FIG. 4 represents a unit information dot, each unit information dot carries the same amount of information, and a size of the circle represents a size of the occupied space. The unit information dot in the first region occupies larger space than the unit information dot in the second region. In this manner, the information in the second region can be compressed.

Figure 5:
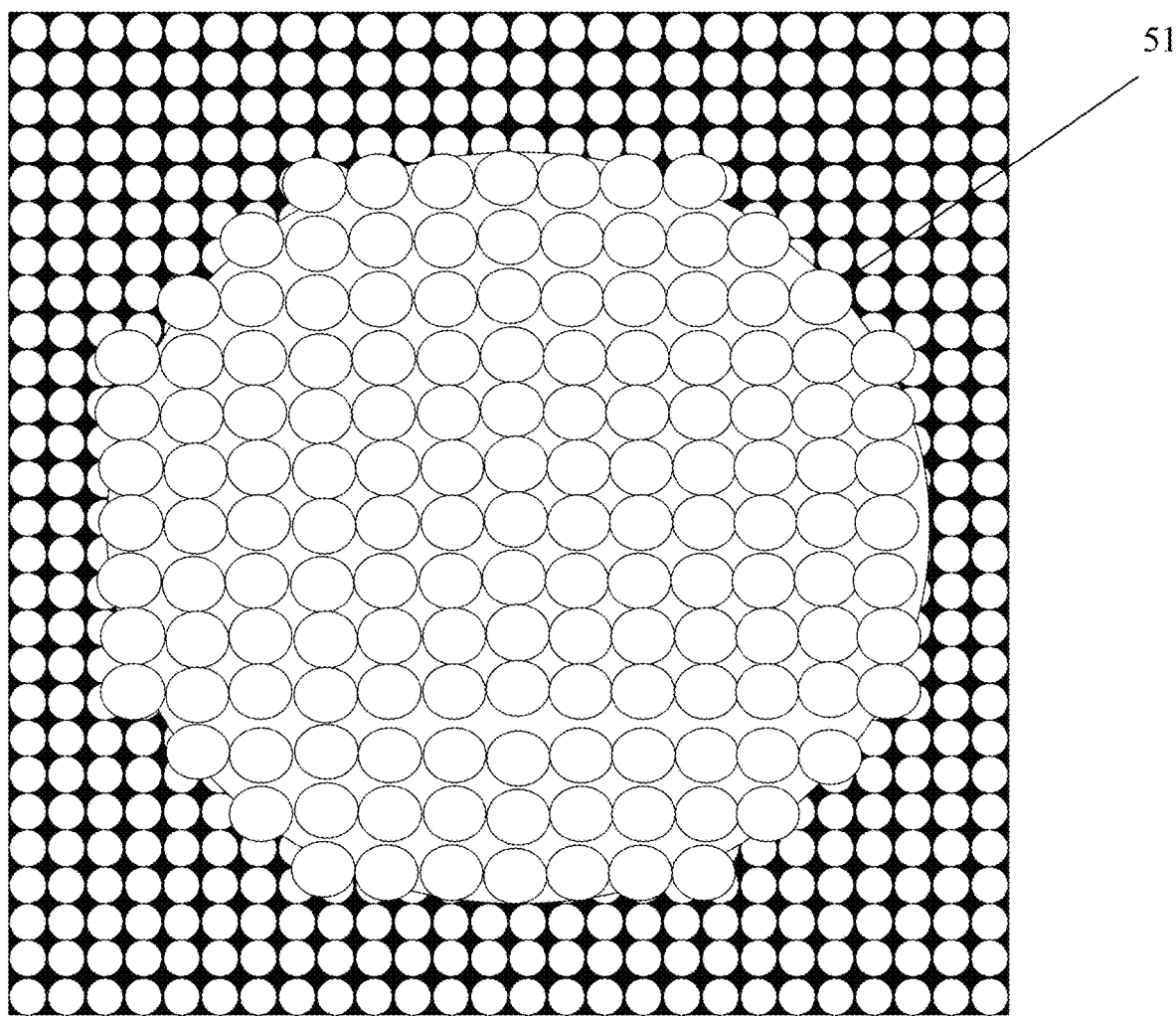
FIG. 5 is a schematic diagram illustrating division of the visible region in a circular manner according to an embodiment of the present disclosure.

In another implementation, the visible region may be divided in a circular mode. For example, FIG. 5 shows the entire region visible by a single eye, in which the region in the circular frame indicated by 51 is a first region, and in the entire region visible by a single eye, the other region excluding the first region is a second region. Each circle in FIG. 5 represents a unit information dot, each unit information dot carries the same amount of information, and a size of the circle represents a size of the occupied space. The unit information dot in the first region occupies larger space than the unit information dot in the second region. In this manner, the information in the second region can be compressed. Since a human eye focuses on the middle of the visible region, the influence of distortion decreases, but more information are contained, as getting closer to the edge.

At step 3030, the virtual reality display device sets the target curvature of at least one position contained in the first region as a preset curvature parameter, and calculates the target curvature of at least one position in the second region.

The step of calculating the target curvature of at least one position in the second region includes: calculating to obtain the target curvature of the at least one position in the second region based on a distance between the viewer and the curved display surface, as well as the center of the visible region of the viewer. The target curvature of a corresponding position of the at least one position in the second region is proportional to the distance of the position to the center of the visible region.

In other embodiments of the present disclosure, the virtual reality display device may provide two quasi-conformal mapping schemes: one is a curvature varying method based on an exponential function, and the other is a curvature varying method based on a Gaussian function. The viewer may select a quasi-conformal mapping function according to his/her viewing preferences.

In an implementation, the exponential function is used to calculate the target curvature of at least one position in the visible region. In an embodiment, the calculation is performed by:

$$Cur(x, y, z) = \begin{cases} \kappa \exp(|x - C_x| + |y - C_y| + |z - C_z| + \lambda(L - k)^2) & (x, y) \in \text{Second Region} \\ \chi & (x, y) \in \text{First Region} \end{cases} \quad (3)$$

where $(x, y, z)$ represents a position in the curved display surface, $(C_x, C_y, C_z)$ represents a spatial position of the center of the visible region of the viewer, and $\kappa$ represents an adjustment factor for controlling the speed of curvature change. L represents a distance from the viewer to the curved display surface, where $\kappa$ may be automatically adjusted by the viewer. k is a constant for determining a curvature of the curved display surface from the viewpoint. $\lambda$ is used for adjusting the influence of the distance L between the curved display surface and the viewer on the curvature of the position in the visible region, and the large $\lambda$ is, the strong the influence will be. $\chi$ is a preset curvature parameter for characterizing a target curvature of the first region in the visible region, and may be set to zero, representing that planar projection is adopted in the first region. Similarly, if all the projection regions are set as the first region, this scheme is the so-called planar projection mode in the existing art.

In another implementation, the Gaussian function is used to calculate the target curvature of at least one position in the visible region. In an embodiment, the calculation is performed by:

$$Cur(x, y, z) = \begin{cases} \kappa \exp(((x - C_x)^2 + (y - C_y)^2 + (z - C_z)^2)/\delta^2 + \lambda(L - k)^2) & (x, y) \in \text{Second Region} \\ \chi & (x, y) \in \text{First Region} \end{cases} \quad (4)$$

where $\delta$ describes a variance of the Gaussian function and steepness of the curvature change. The remaining parameters are the same as in formula (3).

Figure 6:
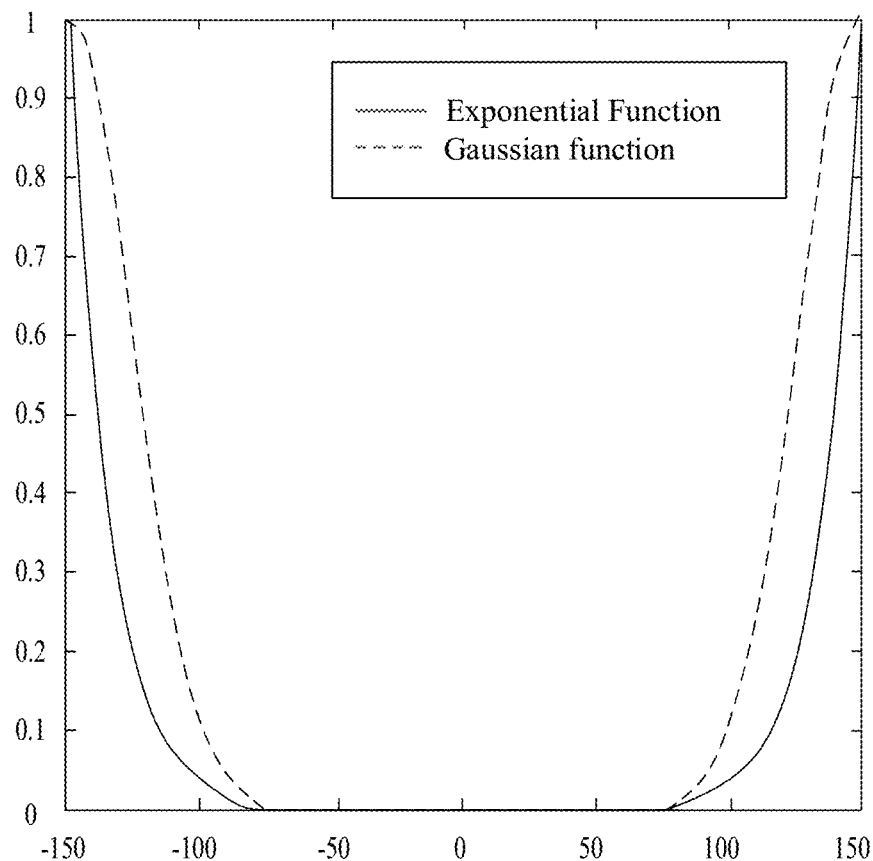
FIG. 6 is a schematic diagram illustrating target curvatures after calculating curvatures using different quasi-conformal mapping functions according to an embodiment of the present disclosure.

The target curvature at each position of the visible region is calculated through the above two schemes and the results are as shown in FIG. 6, in which: the abscissa axis represents positions in the curved display surface, point 0 represents the center of the visible region, the left extension is negative, and the right extension is positive, the ordinate axis represents each target curvature in the visible region, the solid line represents target curvatures in the visible region calculated from the exponential function, and the dotted line represents target curvatures in the visible region calculated from the Gaussian function. It can be observed that as the position gets farther from the center of the visible range (i.e., center of the visible region), the target curvature becomes larger and the information is more compressed. By contrast, the target curvatures calculated by the Gaussian function have more smooth transition, but the target curvatures calculated by the exponential function can have a wider distortion-free display region. Selection of the scheme may be made according to the characteristics of the apparatus and the user.

At step 3040, the virtual reality display device adjusts, based on the target curvatures of the at least two positions in the visible region, curvatures of different positions on the curved display surface.

At step 3050, the virtual reality display device acquires a positional correspondence relation between the multimedia data to be displayed and the curved display surface having the adjusted curvature.

In an embodiment, the virtual reality display device maps the multimedia data to be displayed to a spherical reference surface to obtain a positional relation between the multimedia data to be displayed and the spherical reference surface; maps the curved display surface having the adjusted curvature to the spherical reference surface to obtain a positional relation between the curved display surface having the adjusted curvature and the spherical reference surface; wherein the spherical reference surface is configured to indicate the positional correspondence relation between the multimedia data to be displayed and the curved display surface having the adjusted curvature; and determines, based on the positional relation between the multimedia data to be displayed and the spherical reference surface, and the positional relation between the curved display surface having the adjusted curvature and the spherical reference surface, the positional correspondence relation between the multimedia data to be displayed and the curved display surface having the adjusted curvature.

In other embodiments of the present disclosure, the multimedia data to be displayed and the curved display surface having the adjusted curvature are corresponded with the spherical reference surface as a reference surface. Before mapping the multimedia data to be displayed to the spherical reference surface, the virtual reality display device further needs to obtain a resolution of the multimedia data to be displayed, and map the multimedia data to be displayed as input data Input(x, y) into a unit space U(x, y) based on the resolution of the multimedia data to be displayed, where the resolution refers to the number of vertical and horizontal pixel points of the content drawn by a video or Graphics Processing Unit (GPU), such as 4K (3840×2160), 8K (7680×4320), and the like. The multimedia data to be displayed, which has been mapped into the unit space U(x, y), is further mapped to the spherical reference surface Sphere(θ, φ), which is expressed as:

$$\text{Input}(x,y) \to U(x,y) \leftrightarrow \text{Sphere}(\theta,\varphi) \quad (5).$$

In other embodiments of the present disclosure, the mapping to the unit space according to the resolution of the multimedia data to be displayed may be performed by:

$$x = ((m-M-0.5/(M-1)) \times Gx,$$

$$y = ((n-N-0.5/(N-1)) \times Gy \quad (6);$$

where (x,y) represents the coordinates mapped to the unit space U(x, y), (m, n) represents coordinates of a pixel point in the multimedia image to be displayed relative to the center point of the visible region. (M,N) represents a pixel resolution of the multimedia data to be displayed; for example, when the resolution of the multimedia data to be displayed is 4K (3840×2160), M is 3840, and N is 2160; ($G_x$, $G_y$) represents scale transformation, which usually has a value of $\sqrt{2}$, and serves to normalize the coordinates, by which the maximum distance to the center point of the visible region may be mapped to 1.

In an embodiment, the mapping of the multimedia data to be displayed, which has been mapped into the unit space U(x, y), to the spherical reference surface Sphere(x, y) may be performed by:

$$\theta = \frac{x}{\cos\varphi_0} + \theta_0,$$

$$\varphi = y + \varphi_0; \quad (6)$$

where (x, y) represents the coordinates mapped to the unit space U(x, y), (θ, φ) represents longitude and latitude coordinates mapped to the spherical reference surface, ($\theta_0$, $\varphi_0$) represents parameters selected by the Equi-Rectangular Projection (ERP) mapping, which usually has a default value of (−0.5, 0) in a 360° panoramic video or image data.

In other embodiments of the present disclosure, the curved display surface having the adjusted curvature is mapped to the spherical reference surface to obtain a positional relation between the curved display surface having the adjusted curvature and the spherical reference surface. In an embodiment, a curvature of each position in the curved display surface is obtained, and the curved display surface having the adjusted curvature is mapped onto the spherical reference surface based on the curvature and spatial coordinates of each position in the curved display surface on the curved display surface. The calculation process may be expressed as:

$$\Theta(x,y) \to Cur(x,y,z) \leftrightarrow \text{Sphere}(\theta,\varphi) \quad (8);$$

where Θ(x, y) represents spatial coordinates of the position in the curved display surface.

In summary, the positional correspondence relation between the multimedia data to be displayed and the curved display surface having the adjusted curvature can be obtained from formulas (5) and (8).

At step 3060, the virtual reality display device generates target display multimedia data based on the positional correspondence relation between the multimedia data to be displayed and the curved display surface having the adjusted curvature, and displays the target display multimedia data in the curved display surface having the adjusted curvature.

In an embodiment, the virtual reality display device may perform pixel interpolation on the multimedia data to be displayed based on the positional correspondence relation between the curved display surface having the adjusted curvature and the multimedia data to be displayed to obtain the target display multimedia data.

In this embodiment, since the curved display surface having the adjusted curvature is curved, while the multimedia data to be displayed is a flat video or image, even if the positional relation between the curved display surface having the adjusted curvature and the multimedia data to be displayed is determined, it cannot determine that any position in the curved display surface having the adjusted curvature has exactly one corresponding pixel point in the multimedia data to be displayed. In general, one position in the curved display surface having the adjusted curvature may correspond to a point between two pixel points of the multimedia data to be displayed, which is not a complete pixel point. In this case, pixel interpolation is performed on the position to obtain accurate pixel information of the position in the curved display surface, so as to obtain the target display multimedia data.

Figure 7:
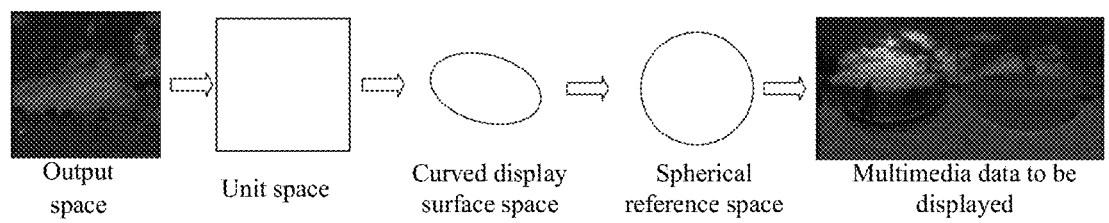
FIG. 7 is a schematic diagram of a mapping flow provided in an embodiment of the present disclosure.

In an embodiment, based on the positional correspondence relation between the multimedia data to be displayed and the curved display surface having the adjusted curvature, an output position of the multimedia data to be displayed in the curved display surface having the adjusted curvature, and thus the multimedia data to be output Output*(x, y), can be obtained. As shown in FIG. 7, the multimedia data to be output Output*(x, y) is inversely mapped to obtain the pixel coordinate information of each pixel point in the output space in the input space (i.e., the multimedia data to be displayed). Then, the multimedia data to be output Output*(x, y) is transformed from the output space to the unit space U'(x, y), and a blurred display region corresponding to the curved display surface, i.e., the second region, is mapped as a plane. The unit space U'(x,y) is mapped to the curved display surface space having the adjusted curvature, results of the mapped curved display surface having the adjusted curvature Θ(x, y) are mapped to the spherical reference space to obtain a correspondence relation between Θ(x, y) and the spherical reference surface Sphere(x, y), and finally a correspondence relation between the multimedia data to be output Output*(x, y) and the multimedia data to be displayed Input(x, y) is acquired from formula (5), which is shown as:

$$\text{Output}^*(x,y) \to U'(X,Y) \to \Theta(x,y) \leftrightarrow \text{Sphere}(\theta,\varphi) \leftrightarrow \text{Input}(x,y) \quad (9);$$

the spatial positional relation between the multimedia data to be output and the multimedia data to be displayed can be known from formula (9), and a relevant region is selected from the multimedia data to be displayed according to the positional relation to perform pixel interpolation on the multimedia data to be displayed, thereby obtaining the target display multimedia data. The method is expressed as:

$$\text{Input}(c,y)_{x,y\in\Omega} \xrightarrow{\text{InpterpolationMethod}} \text{Output}(x,y); \quad (10)$$

wherein the pixel interpolation method may select a bilinear interpolation algorithm in a Cartesian coordinate system or a polar coordinate system, a multiphase image (Lanczos) interpolation algorithm or a directional interpolation algorithm, or the like.

The explanation of the same steps or related concepts in this embodiment as in other embodiments may refer to the description in other embodiments.

In an embodiment of the present disclosure, there is provided a virtual reality display method that can support VR wide-angle display by adjusting the curvature of the curved display surface, and reduce the distortion otherwise caused by the wide-angle display by means of the quasi-conformal mapping principle. In addition, by acquiring the division information input by the user, this embodiment can realize fine display of the center of the visible region and fuzzy display of the extension region, and the curved display surface can assign a wider display region (a region closer to the center of the field of view) to effective information, so as to ensure that the distortion at the central region is controllable even under the condition that the FOV is continuously enlarged, and to simulate the stretching/shrinking effect more truly, thereby enhancing the immersion. A user can freely select a suitable FOV and a region of interest through a key or a sensor, thereby having high user affinity.

Figure 8:
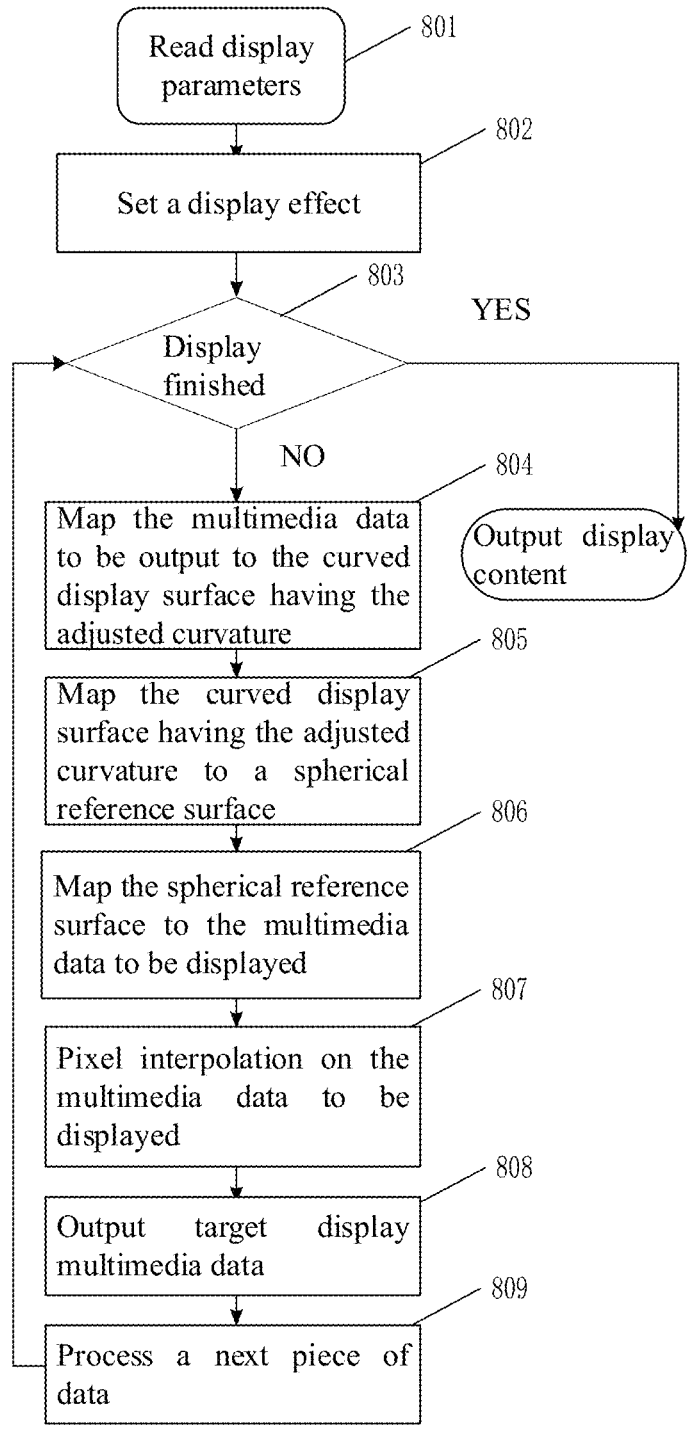
FIG. 8 is a schematic diagram illustrating an implementation flow of yet another virtual reality display method according to an embodiment of the present disclosure.

Based on the above embodiment, the present disclosure provides still another virtual reality display method. The method, as shown in FIG. 8, includes steps 801 to 809.

At step 801, display parameters are read.

The display parameters include a multimedia image to be displayed and a resolution thereof, and preference settings of a user. Here, the preference settings of the user may include a distance from a viewpoint of the user to the display screen, a divided shape and size of the visible region, and a quasi-conformal mapping function, and the preference settings may be freely selected by the user by transmitting the settings to the sensor via a button.

At step 802, a display effect is set.

In an embodiment, the virtual reality display device determines a visible region according to the display parameters in step 802, and determines target curvatures of at least two positions in the visible region; and adjusts, based on the target curvatures, the curvatures of different positions in the curved display surface to obtain an output position of the multimedia data to be displayed in the curved display surface having the adjusted curvature, and thus obtain the multimedia data to be output Output*(x, y).

At step 803, it is judged whether the display is finished.

Here, if not, the process continues to steps 804 to 809; if yes, the display content is output.

At step 804, the multimedia data to be output is mapped to the curved display surface having the adjusted curvature.

At step 805, the curved display surface having the adjusted curvature is mapped to a spherical reference surface.

At step 806, the spherical reference surface is mapped to the multimedia data to be displayed.

At step 807, pixel interpolation is performed on the multimedia data to be displayed.

In an embodiment, through steps 804 to 806, a positional correspondence relation between the multimedia data to be output Output*(x, y) and the multimedia data to be displayed Input(x, y) is obtained, and a relevant region is selected from the multimedia data to be displayed according to the positional correspondence relation to perform pixel interpolation on the multimedia data to be displayed, thereby obtaining the target display multimedia data.

At step 808, the target display multimedia data is output.

At step 809, a next piece of data is processed.

In an embodiment, steps 803 to 809 are executed again in the processing of the next piece of data, until data display of the multimedia data to be displayed is completed.

The explanation of the same steps or related concepts in this embodiment as in other embodiments may refer to the description in other embodiments.

Figure 9:
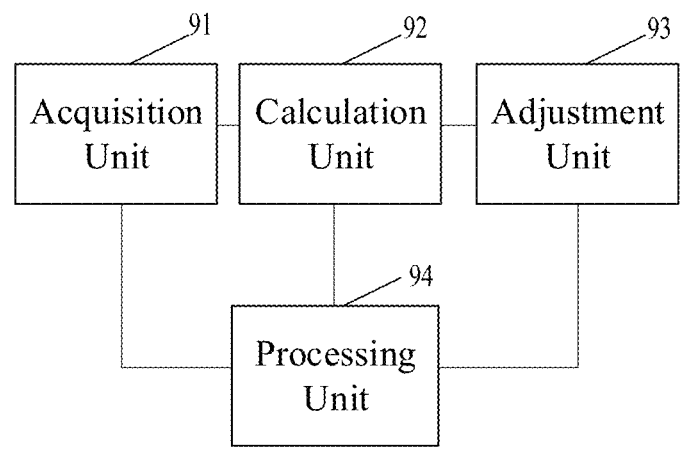
FIG. 9 is a schematic diagram illustrating structural components of a virtual reality display device according to an embodiment of the disclosure.

In order to implement the virtual reality display method provided by the present disclosure, in an embodiment of the present disclosure, there is provided a virtual reality display device that can be applied to the virtual reality display method provided in the embodiments corresponding to FIGS. 1, 3 and 8. Referring to FIG. 9, the virtual reality display device includes: an acquisition unit 91, a calculation unit 92, an adjustment unit 93, and a processing unit 94.

The acquisition unit 91 is configured to acquire multimedia data to be displayed and a visible region of a viewer on a curved display surface, wherein the visible region is obtained by projecting a visible range of the viewer to the curved display surface, and the visible region is not larger than a display area of the curved display surface.

The calculation unit 92 is configured to determine target curvatures of at least two positions in the visible region of the viewer, wherein in the target curvatures of the at least two positions, target curvatures of different positions are related to a distance to a center of the visible region of the viewer.

The adjustment unit 93 is configured to adjust, based on the target curvatures of the at least two positions in the visible region, a curvature of a corresponding position on the curved display surface.

The processing unit 94 is configured to map the multimedia data to be displayed to the curved display surface having the adjusted curvature.

In other embodiments of the present disclosure, the processing unit 94 is configured to divide the visible region into at least a first region and a second region; and set the target curvature of at least one position contained in the first region as a preset curvature parameter.

The calculation unit 92 is configured to calculate the target curvature of at least one position in the second region.

In other embodiments of the present disclosure, the calculation unit 92 is configured to calculate to obtain the target curvature of the at least one position in the second region based on a distance between the viewer and the curved display surface, as well as the center of the visible region of the viewer, wherein the target curvatures of different positions of the at least one position in the second region are proportional to the distances of different positions to the center of the visible region.

In other embodiments of the present disclosure, the acquisition unit 91 is further configured to acquire a positional correspondence relation between the multimedia data to be displayed and the curved display surface having the adjusted curvature.

The processing unit 94 is further configured to generate target display multimedia data based on the positional correspondence relation between the multimedia data to be displayed and the curved display surface having the adjusted curvature, and display the target display multimedia data in the curved display surface having the adjusted curvature.

In other embodiments of the present disclosure, the processing unit 94 is further configured to map the multimedia data to be displayed to a spherical reference surface to obtain a positional relation between the multimedia data to be displayed and the spherical reference surface; map the curved display surface having the adjusted curvature to the spherical reference surface to obtain a positional relation between the curved display surface having the adjusted curvature and the spherical reference surface, wherein the spherical reference surface is configured to indicate the positional correspondence relation between the multimedia data to be displayed and the curved display surface having the adjusted curvature; and determine, based on the positional relation between the multimedia data to be displayed and the spherical reference surface, and the positional relation between the curved display surface having the adjusted curvature and the spherical reference surface, the positional correspondence relation between the multimedia data to be displayed and the curved display surface having the adjusted curvature.

In other embodiments of the present disclosure, the processing unit 94 is further configured to perform pixel interpolation on the multimedia data to be displayed based on the positional correspondence relation between the curved display surface having the adjusted curvature and the multimedia data to be displayed to obtain the target display multimedia data.

Figure 10:
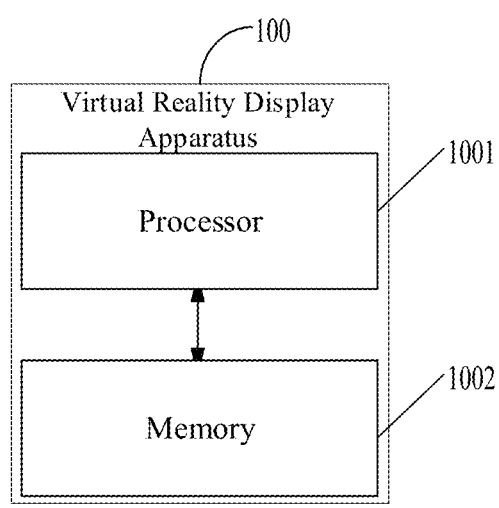
FIG. 10 is a schematic diagram illustrating hardware structures of a virtual reality display apparatus according to an embodiment of the present disclosure.

Based on the hardware implementation of the multiple units in the virtual reality display device and in order to implement the virtual reality display method provided in the embodiments of the present disclosure, in an embodiment of the present disclosure, there is further provided a virtual reality display apparatus. As shown in FIG. 10, the virtual reality display apparatus 100 includes: a processor 1001, and a memory 1002 configured to store a computer program operable on the processor.

The processor 61 is configured to, when executing the computer program, perform the method in any of the above embodiments.

In an exemplary embodiment, the present disclosure further provides a computer-readable storage medium that causes any of the above methods to be implemented. The computer-readable storage medium may be a memory such as a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disc, or a Compact Disc Read-Only Memory (CD-ROM).

Embodiments of the present disclosure may be provided as a method, a system, or a computer program product. Accordingly, the present disclosure may take the form of a hardware embodiment, a software embodiment, or a combination embodiment of software and hardware. Moreover, the present disclosure may take the form of a computer program product embodied on one or more computer-usable storage media (including disk storage and optical storage, etc.) including a computer-usable program code.

The present disclosure has been described with reference to flowcharts and/or block diagrams of the methods, apparatus (systems), and computer program products according to the embodiments of the present disclosure. In the present disclosure, each flow and/or block in the flowcharts and/or block diagrams, as well as any combination thereof, may be implemented by computer program instructions. These computer program instructions may be provided to a general purpose computer, a special purpose computer, an embedded processor, or a processor of other programmable data processing apparatus, such that the instructions, which execute via the processor of the computer or other programmable data processing apparatus, create means for implementing the functions specified in one or more flows of the flowchart and/or one or more blocks of the block diagram.

These computer program instructions may also be stored in a computer readable memory that can direct a computer or other programmable data processing apparatus to operate in a particular manner, such that the instructions stored in the computer readable memory produce an article of manufacture comprising an instruction means for implementing the functions specified in one or more flows of the flowchart and/or one or more blocks of the block diagram.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in one or more flows of the flowchart and/or one or more blocks of the block diagram.

What is claimed is:

1. A virtual reality display method, comprising:
acquiring multimedia data to be displayed and a visible region of a viewer on a curved display surface, wherein the visible region is obtained by projecting a visible range of the viewer to the curved display surface, and the visible region is not larger than a display area of the curved display surface;
determining target curvatures of at least two positions in the visible region of the viewer, wherein in the target curvatures of the at least two positions, target curvatures of different positions are related to a distance to a center of the visible region of the viewer;
adjusting, based on the target curvatures of the at least two positions in the visible region, a curvature of a corresponding position on the curved display surface; and
mapping the multimedia data to be displayed to the curved display surface having the adjusted curvature,
wherein the step of mapping the multimedia data to be displayed to the curved display surface having the adjusted curvature comprises:
acquiring a positional correspondence relation between the multimedia data to be displayed and the curved display surface having the adjusted curvature;
generating target display multimedia data based on the positional correspondence relation between the multimedia data to be displayed and the curved display surface having the adjusted curvature, and displaying the target display multimedia data in the curved display surface having the adjusted curvature,
wherein the step of generating the target display multimedia data based on the positional correspondence relation between the multimedia data to be displayed and the curved display surface having the adjusted curvature comprises:
performing pixel interpolation on the multimedia data to be displayed based on the positional correspondence relation between the curved display surface having the adjusted curvature and the multimedia data to be displayed to obtain the target display multimedia data.

2. The method according to claim 1, wherein the step of determining the target curvatures of at least two positions in the visible region of the viewer comprises:
dividing the visible region into at least a first region and a second region; and
setting a target curvature of at least one position contained in the first region as a preset curvature parameter, and calculating a target curvature of at least one position in the second region.

3. The method according to claim 2, wherein the step of calculating the target curvature of the at least one position in the second region comprises:
calculating to obtain the target curvature of the at least one position in the second region based on a distance between the viewer and the curved display surface as well as the center of the visible region of the viewer, wherein a target curvature of a corresponding position of the at least one position in the second region is proportional to a distance of the corresponding position to the center of the visible region.

4. The method according to claim 1, wherein the step of acquiring the positional correspondence relation between the multimedia data to be displayed and the curved display surface having the adjusted curvature comprises:
mapping the multimedia data to be displayed to a spherical reference surface to obtain a positional relation between the multimedia data to be displayed and the spherical reference surface;
mapping the curved display surface having the adjusted curvature to the spherical reference surface to obtain a positional relation between the curved display surface having the adjusted curvature and the spherical reference surface, wherein the spherical reference surface is configured to indicate the positional correspondence relation between the multimedia data to be displayed and the curved display surface having the adjusted curvature; and
determining, based on the positional relation between the multimedia data to be displayed and the spherical reference surface, and the positional relation between the curved display surface having the adjusted curvature and the spherical reference surface, the positional correspondence relation between the multimedia data to be displayed and the curved display surface having the adjusted curvature.

5. A virtual reality display device, comprising a processor, and a memory having a program stored therein which, when executed by the processor, causes the processor to:
acquire multimedia data to be displayed and a visible region of a viewer on a curved display surface, wherein the visible region is obtained by projecting a visible range of the viewer to the curved display surface, and the visible region is not larger than a display area of the curved display surface;
determine target curvatures of at least two positions in the visible region of the viewer, wherein in the target curvatures of the at least two positions, target curvatures of different positions being related to a distance to a center of the visible region of the viewer;
adjust, based on the target curvatures of the at least two positions in the visible region, a curvature of a corresponding position on the curved display surface; and
map the multimedia data to be displayed to the curved display surface having the adjusted curvature,
wherein the program, when executed by the processor, further causes the processor to:
acquire a positional correspondence relation between the multimedia data to be displayed and the curved display surface having the adjusted curvature;
generate target display multimedia data based on the positional correspondence relation between the multimedia data to be displayed and the curved display surface having the adjusted curvature, and display the target display multimedia data in the curved display surface having the adjusted curvature,
wherein the program, when executed by the processor, further causes the processor to:
perform pixel interpolation on the multimedia data to be displayed based on the positional correspondence relation between the curved display surface having the adjusted curvature and the multimedia data to be displayed to obtain the target display multimedia data.

6. The device according to claim 5, wherein the program, when executed by the processor, further causes the processor to:
divide the visible region into at least a first region and a second region; and set a target curvature of at least one position contained in the first region as a preset curvature parameter; and
calculate a target curvature of at least one position in the second region.

7. The device according to claim 6, wherein the program, when executed by the processor, further causes the processor to:
calculate to obtain the target curvature of the at least one position in the second region based on a distance between the viewer and the curved display surface as well as the center of the visible region of the viewer, wherein a target curvature of a corresponding position of the at least one position in the second region is proportional to a distance of the corresponding position to the center of the visible region.

8. The device according to claim 5, wherein the program, when executed by the processor, further causes the processor to:
map the multimedia data to be displayed to a spherical reference surface to obtain a positional relation between the multimedia data to be displayed and the spherical reference surface;
map the curved display surface having the adjusted curvature to the spherical reference surface to obtain a positional relation between the curved display surface having the adjusted curvature and the spherical reference surface, wherein the spherical reference surface is configured to indicate the positional correspondence relation between the multimedia data to be displayed and the curved display surface having the adjusted curvature; and
determine, based on the positional relation between the multimedia data to be displayed and the spherical reference surface, and the positional relation between the curved display surface having the adjusted curvature and the spherical reference surface, the positional correspondence relation between the multimedia data to be displayed and the curved display surface having the adjusted curvature.

9. A virtual reality display apparatus, comprising a processor and a memory configured to store a computer program operable on the processor,
wherein the processor is configured to execute the computer program to perform the method of claim 1.

10. A non-transitory computer-readable storage medium storing computer executable instructions thereon which, when executed by a processor, cause the processor to implement the method of claim 1.

* * * * *

UNITED STATES PATENT AND TRADEMARK OFFICE
CERTIFICATE OF CORRECTION

| | | |
|---|---|---|
| PATENT NO. | : 11,474,594 B2 | Page 1 of 1 |
| APPLICATION NO. | : 17/311393 | |
| DATED | : October 18, 2022 | |
| INVENTOR(S) | : Dehui Kong et al. | |

It is certified that error appears in the above-identified patent and that said Letters Patent is hereby corrected as shown below:

On the Title Page

Item (87) PCT Pub. No. should read: WO2020/119822

Signed and Sealed this
Twentieth Day of December, 2022

Katherine Kelly Vidal
*Director of the United States Patent and Trademark Office*